United States Patent
Park et al.

(10) Patent No.: US 10,836,246 B1
(45) Date of Patent: *Nov. 17, 2020

(54) POWER TRANSMISSION APPARATUS FOR HYBRID ELECTRIC VEHICLE

(71) Applicants: Hyundai Motor Company, Seoul (KR); Kia Motors Corporation, Seoul (KR)

(72) Inventors: Juhyeon Park, Uiryeong-Eup (KR); Yong Uk Shin, Suwon-Si (KR); Seongwook Ji, Gunpo-Si (KR); Ki Tae Kim, Incheon (KR); Woochurl Son, Seongnam-Si (KR); Wonmin Cho, Hwaseong-Si (KR); Ilhan Yoo, Hwaseong-Si (KR); Woo Jin Chang, Suwon-Si (KR); Seong Wook Hwang, Gunpo-Si (KR); Chon Ok Kim, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,996

(22) Filed: Aug. 14, 2019

(30) Foreign Application Priority Data

May 8, 2019 (KR) .......................... 10-2019-0053471

(51) Int. Cl.
*B60K 6/365* (2007.10)
*F16H 37/04* (2006.01)
(Continued)

(52) U.S. Cl.
CPC ................. *B60K 6/365* (2013.01); *B60K 6/26* (2013.01); *F16H 3/002* (2013.01); *F16H 37/046* (2013.01); *B60W 10/113* (2013.01)

(58) Field of Classification Search
None
See application file for complete search history.

(56) References Cited

U.S. PATENT DOCUMENTS 8,323,142 B2    12/2012  Masumoto
10,704,652 B2 *  7/2020  Jang ........................ F16H 3/006
(Continued)

FOREIGN PATENT DOCUMENTS

EP          3 121 483 A1     1/2017

*Primary Examiner* — Justin Holmes
(74) *Attorney, Agent, or Firm* — Morgan, Lewis & Bockius LLP

(57) ABSTRACT

A power transmission apparatus may include a motor/generator having a rotor selectively connectable to an engine output shaft, a first input shaft mounted along an axis of the engine output shaft and fixedly connected to the rotor, a second input shaft external and selectively connectable to the first input shaft, first and second intermediate shafts and an output shaft mounted in parallel with the input shafts, a planetary gear set mounted on the output shaft, having a sun gear fixedly connected to the output shaft, selectively receiving torques from the first and second input shafts and the first and second intermediate shafts, and outputting the shifted torque based on the received torques to the output shaft, and a plurality of gear sets allowing torque flows between the first and second input shafts, the first and second intermediate shafts, and the output shaft.

20 Claims, 6 Drawing Sheets

(51) Int. Cl.
*F16H 3/00* (2006.01)
*B60K 6/26* (2007.10)
*B60W 10/113* (2012.01)

(56) References Cited

U.S. PATENT DOCUMENTS

| | | |
|---|---|---|
| 2013/0031990 A1 | 2/2013 | Singh et al. |
| 2015/0165888 A1* | 6/2015 | Lee .................... B60K 6/48 |
| | | 475/5 |
| 2015/0165894 A1* | 6/2015 | Park ................... B60K 6/365 |
| | | 475/5 |
| 2016/0052381 A1* | 2/2016 | Kaltenbach .......... B60W 10/06 |
| | | 180/65.23 |
| 2016/0167503 A1* | 6/2016 | Lee .................... B60K 6/543 |
| | | 475/5 |
| 2017/0096137 A1* | 4/2017 | Toyama ............... F16H 3/724 |
| 2018/0112743 A1* | 4/2018 | Lee .................... F16H 3/085 |
| 2019/0120351 A1* | 4/2019 | Cho .................... F16H 3/006 |
| 2019/0217860 A1* | 7/2019 | Kishi .................. F16H 3/006 |

\* cited by examiner

FIG. 2

| Shift-stages | | Engagement elements | | | | | SN1 | | SN2 | |
|---|---|---|---|---|---|---|---|---|---|---|
| | | ECL | CL1 | CL2 | CL3 | CL4 | SG1 | N | SG2 | N |
| Engine mode / Parallel mode | FD1 | ● | | ● | | ● | ● | | ○ | ● |
| | FD2 | ● | ● | | | ● | ○ | ● | ● | |
| | FD3 | ● | | | ● | ● | ○ | ● | ○ | ● |
| | FD4 | ● | ● | | ● | | ○ | ● | ● | |
| | FD5 | ● | | ● | ● | | ● | | ○ | ● |
| EV mode | FD1 | | | ● | | ● | ● | | ○ | ● |
| | FD2 | | ● | | | ● | ○ | ● | ● | |
| | FD3 | | | | ● | ● | ○ | ● | ○ | ● |
| | FD4 | | ● | | ● | | ○ | ● | ● | |
| | FD5 | | | ● | ● | | ● | | ○ | ● |

○ : Preliminary engagement available

FIG. 4

| | Shift-stages | Engagement elements | | | | | SN1 | | | SN2 | |
|---|---|---|---|---|---|---|---|---|---|---|---|
| | | ECL | CL1 | CL2 | CL3 | CL4 | SG1 | N | SG3 | SG2 | N |
| Engine mode / Parallel mode | FD1 | ● | | ● | | ● | ● | | | ○ | ● |
| | FD2 | ● | ● | | | ● | ○ | ● | ○ | ● | |
| | FD3 | ● | | ● | | ● | | | | ● | ○ | ● |
| | | ● | | | ● | ● | ○ | ● | ○ | ○ | ● |
| | | ● | | ● | ● | | | | | ● | ○ | ● |
| | FD4 | ● | ● | | ● | | ○ | ● | ○ | ● | |
| | FD5 | ● | | ● | ● | | ● | | | ○ | ● |
| EV mode | FD1 | | | ● | | ● | ● | | | ○ | ● |
| | FD2 | | ● | | | ● | ○ | ● | ○ | ● | |
| | FD3 | | | ● | | ● | | | | ● | ○ | ● |
| | | | | | ● | ● | ○ | ● | ○ | ○ | ● |
| | | | | ● | ● | | | | | ● | ○ | ● |
| | FD4 | | ● | | ● | | ○ | ● | ○ | ● | |
| | FD5 | | | ● | ● | | ● | | | ○ | ● |

○ : Preliminary engagement available

FIG. 6

| | Shift-stages | Engagement elements | | | | | | SN1 | | | SN2 | |
|---|---|---|---|---|---|---|---|---|---|---|---|---|
| | | ECL | CL1 | CL2 | CL3 | CL4 | BK | SG1 | N | SG3 | SG2 | N |
| Engine mode / Parallel mode | FD1 | ● | | ● | | ● | | ● | | | ○ | ● |
| | FD2 | ● | ● | | | ● | | ○ | ● | ○ | ● | |
| | FD3 | ● | | ● | | ● | | | | ● | ○ | ● |
| | | ● | | | ● | ● | | ○ | ● | ○ | ○ | ● |
| | | ● | | ● | ● | | | | | ● | ○ | ● |
| | FD4 | ● | ● | | ● | | | ○ | ● | ○ | ● | |
| | FD5 | ● | | ● | ● | | | ● | | | ○ | ● |
| | FD6 | ● | | | ● | | ● | ○ | ● | ○ | ○ | ● |
| EV mode | FD1 | | | ● | | ● | | ● | | | ○ | ● |
| | FD2 | | ● | | | ● | | ○ | ● | ○ | ● | |
| | FD3 | | | ● | | ● | | | | ● | ○ | ● |
| | | | | | ● | ● | | ○ | ● | ○ | ○ | ● |
| | | | | ● | ● | | | | | ● | ○ | ● |
| | FD4 | | ● | | ● | | | ○ | ● | ○ | ● | |
| | FD5 | | | ● | ● | | | ● | | | ○ | ● |
| | FD6 | | | | ● | | ● | ○ | ● | ○ | ○ | ● |

○ : Preliminary engagement available

POWER TRANSMISSION APPARATUS FOR HYBRID ELECTRIC VEHICLE

CROSS-REFERENCE TO RELATED APPLICATION

The present application claims priority to Korean Patent Application No. 10-2019-0053471 filed on May 8, 2019, the entire contents of which is incorporated herein for all purposes by this reference.

BACKGROUND OF THE INVENTION

Field of the Invention

The present invention relates to a power transmission apparatus according to a hybrid vehicle.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The double clutch transmission (DCT) includes two clutches devices and a gear train of a basically manual transmission, selectively transmits a torque input from an engine to two input shafts by use of the two clutches devices, and outputs a torque shifted by the gear train.

Such a double clutch transmission (DCT) attempts to compactly realize a multi-stage transmission of more than five speeds. The dual-clutch transmission (DCT) achieves an automated manual transmission (AMT) that removes the inconvenience of a manual shifting of a driver, by controlling two clutches and synchronizing devices by a controller.

In comparison with an automatic transmission using planetary gears, such a dual-clutch transmission (DCT) shows merits, such as higher efficiency in power delivery, easier modification in revising or adding parts to achieve more shifting stages, etc., and thus gathers more spotlight since it can more comfortably conform to fuel consumption regulation and efficiency in achieving more shifting stages.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an exemplary power transmission apparatus for a vehicle for a hybrid vehicle which may include a motor/generator having a rotor selectively connectable to an engine output shaft, a first input shaft mounted coaxial with the engine output shaft and fixedly connected to the rotor, a second input shaft formed as a hollow shaft mounted coaxial with and external to the first input shaft, and selectively connectable to the first input shaft, first and second intermediate shafts mounted in parallel with the first input shaft, respectively, an output shaft mounted in parallel with the first and second input shafts and outputting a shifted torque, a planetary gear set mounted on the output shaft, having a sun gear fixedly connected to the output shaft, selectively receiving torques from the first and second input shafts and the first and second intermediate shafts, and outputting the shifted torque based on the received torques to the output shaft, and a plurality of gear sets, each of which allows at least one torque flow between the first and second input shafts, the first and second intermediate shafts, and the output shaft.

The plurality of gear sets may include first to third gear sets. The first gear set may include a first input gear, a first external gear, and a second external gear, the first input gear being fixedly connected to the first input shaft, the first external gear being rotatably mounted on and selectively connectable to the first intermediate shaft and externally gear-meshed with the first input gear, the second external gear being rotatably mounted on the output shaft, externally gear-meshed with the first input gear, and selectively connectable to a planet carrier of the planetary gear set. The second gear set may include a second shifting gear, a third external gear, and a fourth external gear, the second shifting gear being rotatably mounted on the second input shaft and selectively connectable to the second input shaft, the third external gear being rotatably mounted on the output shaft, externally gear-meshed with the second shifting gear, fixedly connected to a ring gear of the planetary gear set, and selectively connectable to the output shaft, the fourth external gear being fixedly connected to the second intermediate shaft and externally gear-meshed with the third external gear. The third gear set may include a first shifting gear and a fifth external gear, the first shifting gear being rotatably mounted on the first intermediate shaft and selectively connectable to the first intermediate shaft, the fifth external gear being fixedly connected to the second intermediate shaft and externally gear-meshed with the first shifting gear.

The first shifting gear may be selectively connectable to the first intermediate shaft by a first synchronizer. The second shifting gear may be selectively connectable to the second input shaft by a second synchronizer.

The planetary gear set may be formed as a single pinion planetary gear set.

An exemplary embodiment of the present invention may further include five clutches each of which facilitating selective connection. The five clutches may include an engine clutch mounted between the engine output shaft and the first input shaft, a first clutch mounted between the first input shaft and the second input shaft, a second clutch mounted between the first external gear and the first intermediate shaft, a third clutch mounted between the second external gear and the planet carrier, and a fourth clutch mounted between the third external gear and the output shaft.

The fourth clutch may be formed as a teeth engagement clutch.

The plurality of gear sets may include first to fourth gear sets. The first gear set may include a first input gear, a first external gear, and a second external gear, the first input gear being fixedly connected to the first input shaft, the first external gear being rotatably mounted on and selectively connectable to the first intermediate shaft and externally gear-meshed with the first input gear, the second external gear being rotatably mounted on the output shaft, externally gear-meshed with the first input gear, and selectively connectable to a planet carrier of the planetary gear set. The second gear set may include a second shifting gear, a third external gear, and a fourth external gear, the second shifting gear being rotatably mounted on the second input shaft and selectively connectable to the second input shaft, the third external gear being rotatably mounted on the output shaft, externally gear-meshed with the second shifting gear, fixedly connected to a ring gear of the planetary gear set, and selectively connectable to the output shaft, the fourth external gear being fixedly connected to the second intermediate shaft and externally gear-meshed with the third external gear. The third gear set may include a first shifting gear and a fifth external gear, the first shifting gear being rotatably mounted on the first intermediate shaft and selectively connectable to the first intermediate shaft, the fifth external gear being fixedly connected to the second intermediate shaft and externally gear-meshed with the first shifting gear. The fourth gear set may include a third shifting gear and a sixth external gear, the third shifting gear being rotatably mounted on the first intermediate shaft and selectively connectable to the first intermediate shaft, the sixth external gear being fixedly connected to the second intermediate shaft and externally gear-meshed with the third shifting gear.

The first shifting gear and the third shifting gear may be selectively connectable by a first synchronizer. The second shifting gear may be selectively connectable to the second input shaft by a second synchronizer.

An exemplary embodiment of the present invention may further include a parking shaft mounted in parallel with the output shaft, wherein a seventh external gear externally gear-meshed with a final reduction gear is fixedly connected to the parking shaft, and wherein a parking gear is fixedly connected to the parking shaft.

The plurality of gear sets may include first to fourth gear sets. The first gear set may include a first input gear, a first external gear, and a second external gear, the first input gear being fixedly connected to the first input shaft, the first external gear being rotatably mounted on and selectively connectable to the first intermediate shaft and externally gear-meshed with the first input gear, the second external gear being rotatably mounted on the output shaft, externally gear-meshed with the first input gear, and selectively connectable to a planet carrier of the planetary gear set. The second gear set may include a second shifting gear, a third external gear, a fourth external gear, and a braking gear, the second shifting gear being rotatably mounted on the second input shaft and selectively connectable to the second input shaft, the third external gear being rotatably mounted on the output shaft, externally gear-meshed with the second shifting gear, fixedly connected to a ring gear of the planetary gear set, and selectively connectable to the output shaft, the fourth external gear being fixedly connected to the second intermediate shaft and externally gear-meshed with the third external gear, the braking gear rotatably being mounted on the parking shaft, externally gear-meshed with the third external gear, and selectively connectable to a transmission housing. The third gear set may include a first shifting gear and a fifth external gear, the first shifting gear being rotatably mounted on the first intermediate shaft and selectively connectable to the first intermediate shaft, the fifth external gear being fixedly connected to the second intermediate shaft and externally gear-meshed with the first shifting gear. The fourth gear set may include a third shifting gear and a sixth external gear, the third shifting gear being rotatably mounted on the first intermediate shaft and selectively connectable to the first intermediate shaft, the sixth external gear being fixedly connected to the second intermediate shaft and externally gear-meshed with the third shifting gear.

The first shifting gear and the third shifting gear may be selectively connectable by a first synchronizer. The second shifting gear may be selectively connectable to the second input shaft by a second synchronizer.

An exemplary embodiment of the present invention may further include five clutches each of which facilitating selective connection, and one brake selectively connecting a corresponding element to the transmission housing.

The one brake may be mounted between the braking gear and the transmission housing.

According to an exemplary embodiment of the present invention, multiple shifting stages may be realized by applying a planetary gear set to a dual clutch type transmission, and by further employing a motor/generator, an electric vehicle mode and a parallel hybrid mode may be realized to the multiple shifting stages.

Therefore, an internal structure may be simplified, shifting efficiency may be improved, and an overall weight may be decreased, improving an installability and fuel consumption characteristics.

Furthermore, by additionally employing a gear set GT4, the third forward speed FD3 may be realized by three different schemes, facilitating a better choice depending on driving circumstances. By designing gear ratios of the first, second, and fourth gear sets GT1, GT2, and GT4, seven forward shifting stages in total may be achieved including three shifting stages between the second forward speed FD2 and the fourth forward speed FD4.

Furthermore, the sixth forward speed FD6 may be additionally realized by additionally employing a parking shaft PKS and a brake BK.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart for power transmission apparatus configured for a hybrid vehicle according to various exemplary embodiments of the present invention.

FIG. 4 is a shifting operation chart for power transmission apparatus configured for a hybrid vehicle according to various exemplary embodiments of the present invention.

FIG. 6 is a shifting operation chart for a power transmission apparatus configured for a hybrid vehicle according to various exemplary embodiments of the present invention.

Figure 1:
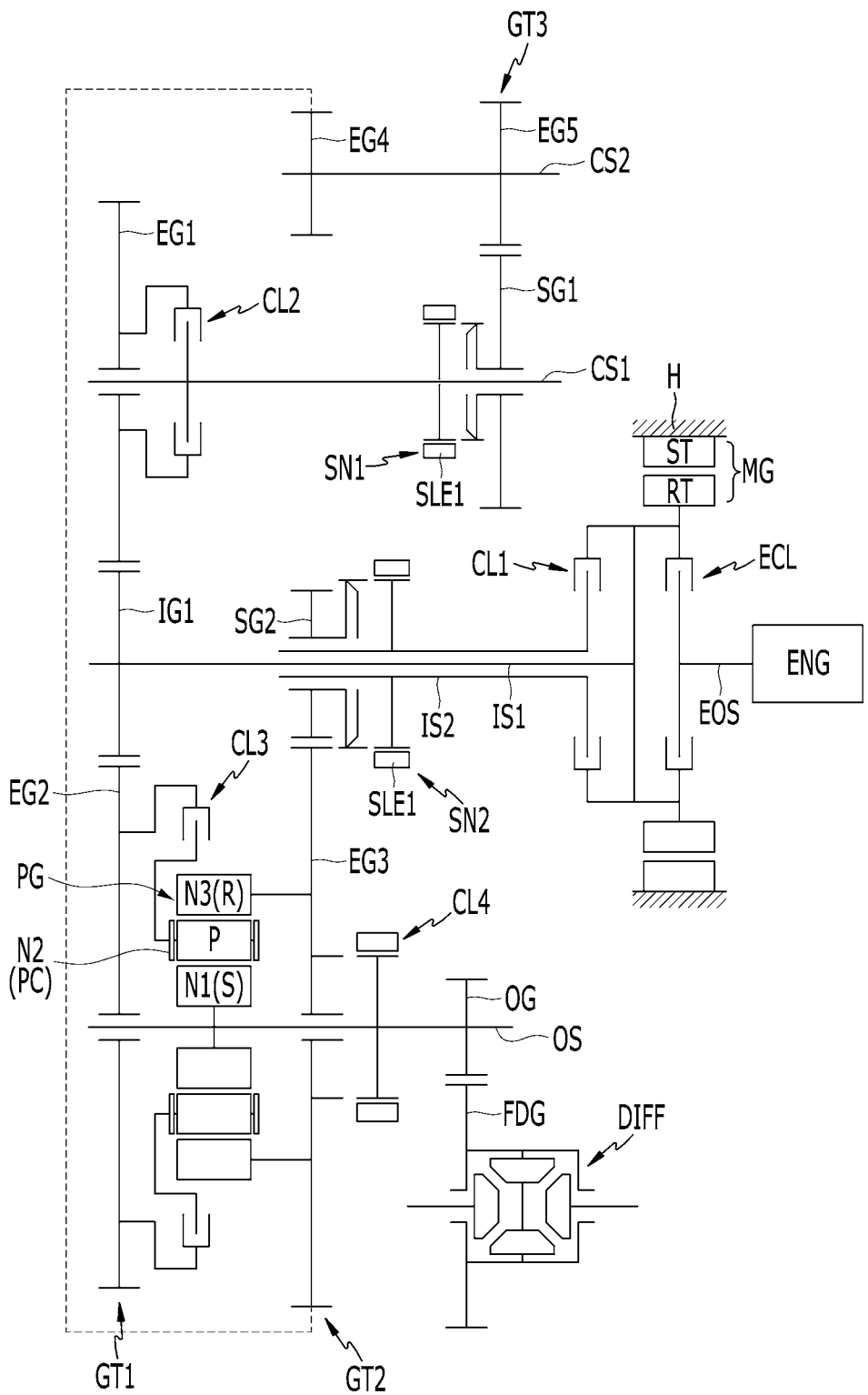
FIG. 1 is a schematic view of power transmission apparatus configured for a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of power transmission apparatus configured for a hybrid vehicle according to various exemplary embodiments of the present invention.

Referring to FIG. 1, a power transmission apparatus according to various exemplary embodiments of the present invention shifts torques of power sources of an engine ENG and the motor/generator MG and includes first and second input shafts IS1 and IS2, first and second intermediate shafts CS1 and CS2, output shaft OS, planetary gear set PG and a plurality of gear sets GT1, GT2, and GT3.

A power source of the power transmission apparatus may be various types of a known engine ENG such as a gasoline engine or a diesel engine.

The motor/generator MG may act as a motor and also as a generator, and includes a stator ST and a rotor RT, where the stator ST is fixed to the transmission housing H and the rotor RT is rotatably supported within the stator ST.

The torques of the engine ENG and the motor/generator MG transmitted to the first input shaft IS1 and the second input shaft IS2 are shifted by the first to third gear sets GT1 to GT3 and a planetary gear set PG into a plurality of shifting stages, and outputted to an output shaft OS.

The first and second input shafts IS1 and IS2 are mounted on a same axis, and the first and second intermediate shafts CS1 and CS2 and the output shaft OS are mounted in parallel with the first input shaft IS1.

The first input shaft IS1 is mounted along an axis of an engine output shaft EOS, selectively connectable to the engine output shaft EOS, and fixedly connected to the rotor RT of the motor/generator MG.

That is, the first input shaft IS1 selectively receives the torque of the engine ENG and always receives the torque of the motor/generator MG.

The second input shaft IS2 is formed as a hollow shaft and mounted coaxial with and external to the first input shaft IS1 without rotational interference therebetween, and selectively connectable to the first input shaft IS1 thereby selectively receiving torques of the engine ENG and the motor/generator MG.

The motor/generator MG is mounted on an axis of the engine output shaft EOS, fixedly connected to the first input shaft IS1, and selectively connectable to the second input shaft IS2.

The first and second intermediate shafts CS1 and CS2 are mounted in parallel with the first input shaft IS1 respectively, and connected to each other through an external gear engagement.

The output shaft OS is mounted in parallel with the first input shaft IS1 and the first and second intermediate shafts CS1 and CS2. The output shaft receives a shifted torque from the first and second input shafts through the first gear set GT1 to third gear set GT3, and transmits the received torque to a differential DIFF through an output gear OG and a final reduction gear FDG The planetary gear set PG is mounted on an axis of the output shaft OS, and fixedly connected to the output shaft OS through a first rotation element N1 (sun gear S). The planetary gear set PG forms a shifted torque by combining the torques selectively received from the first and second input shafts IS1 and IS2 and the first and second intermediate shafts CS1 and CS2, and outputs the shifted torque to the output shaft OS.

The planetary gear set PG is a single pinion planetary gear set, and includes a sun gear S, a planet carrier PC rotatably supporting a plurality of pinion gear P externally gear-meshed with the sun gear S, and a ring gear R internally gear-meshed with the plurality of pinion gear P. The sun gear S acts as a first rotation element N1, the planet carrier PC acts as a second rotation elements N2, and the ring gear R acts as a third rotation elements N3, respectively of the planetary gear set PG.

The plurality of gear sets are mounted over the first and second input shafts IS1 and IS2, the first and second intermediate shafts CS1 and CS2, and the output shaft OS, and form multiple shifted torques from the torques of the first and second input shafts IS1 and IS2.

In more detail, the plurality of gear sets include first, second, and third gear sets GT1, GT2, and GT3 that are mounted over the first and second input shafts IS1 and IS2, the first and second intermediate shafts CS1 and CS2, and the output shaft OS.

The first gear set GT1 includes a first input gear IG1, a first external gear EG1, and a second external gear EG2. The first input gear IG1 is fixedly connected to the first input shaft IS1. The first external gear EG1 is rotatably mounted on the first intermediate shaft CS1, externally gear-meshed with the first input gear IG1, and selectively connectable to the first intermediate shaft CS1. The second external gear EG2 is rotatably mounted on the output shaft OS, externally gear-meshed with the first input gear IG1, and selectively connectable to the planet carrier PC of the planetary gear set PG.

The second gear set GT2 includes a second shifting gear SG2, a third external gear EG3, and a fourth external gear EG4. The second shifting gear SG2 is rotatably mounted on the second input shaft IS2 and selectively connectable to the second input shaft IS2. The third external gear EG3 is rotatably mounted on the output shaft OS, externally gear-meshed with the second shifting gear SG2, fixedly connected to the ring gear of the planetary gear set PG, and selectively connectable to the output shaft OS. The fourth external gear EG4 is fixedly connected to the second intermediate shaft CS2 and externally gear-meshed with the third external gear EG3.

The third gear set GT3 includes a first shifting gear SG1 and a fifth external gear EG5. The first shifting gear SG1 is rotatably mounted on the first intermediate shaft CS1 and selectively connectable to the first intermediate shaft CS1. The fifth external gear EG5 is fixedly connected to the second intermediate shaft CS2 and externally gear-meshed with the first shifting gear SG1.

The planetary gear set PG is mounted between the first gear set GT1 and the second gear set GT2, where the planet carrier PC is selectively connectable to the second external gear EG2 of the first gear set GT1, and the ring gear R is selectively connectable to the third external gear EG3 of the second gear set GT2.

The first shifting gear SG1 is selectively connectable to first intermediate shaft CS1 by the first synchronizer SN1.

The second shifting gear SG2 is selectively connectable to second input shaft IS2 by the second synchronizer SN2.

Gear ratios of drive and driven gears of the first, second, and third gear sets GT1, GT2, and GT3 may be appropriately set according to desired feature of the transmission.

Furthermore, engagement elements of five clutches ECL, CL1, CL2, CL3, and CL4 are mounted between rotation members such as various shafts.

The engine clutch ECL is mounted between the engine output shaft EOS and the first input shaft IS1, and selectively connects the engine output shaft EOS and the first input shaft IS1, controlling torque transmission therebetween.

The first clutch CL1 is mounted between the first input shaft IS1 and the second input shaft IS2, and selectively connects the first input shaft IS1 and the second input shaft IS2, controlling torque transmission therebetween.

The second clutch CL2 is mounted between the first external gear EG1 and the first intermediate shaft CS1, and selectively connects the first external gear EG1 and the first intermediate shaft CS1, controlling torque transmission therebetween.

The third clutch CL3 is mounted between the second external gear EG2 and the planet carrier PC, and selectively connects the second external gear EG2 and the planet carrier PC, controlling torque transmission therebetween.

The fourth clutch CL4 is mounted between the third external gear EG3 and the output shaft OS, and selectively connects the third external gear EG3 and the output shaft OS, controlling torque transmission therebetween.

The engagement elements of the engine clutch ECL and the first, second, third, and fourth clutches C1, C2, C3, and C4 may be realized as multi-plate hydraulic pressure friction devices that are frictionally engaged by hydraulic pressure, however, it may not be understood to be limited thereto, since various other configuration that are electrically controllable may be available.

In the disclosure, when two or more members are described to be "fixedly connected", where the member may be any of a shaft, an input shaft, an output shaft, a rotation member, and a transmission housing, it means that the fixedly connected members always rotate at a same speed.

That is, rotation elements and/or shafts fixedly interconnected rotate in a same rotating direction and at a same rotation speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

In an example, the fourth clutch CL4 may be formed as a teeth engagement clutch, which is also referred to as a dog clutch, improving torque transmission efficiency to the output shaft OS, and reducing a length of a transmission.

The first and second synchronizers SN1 and SN2 may be formed as a known scheme, and first and second sleeves SLE1 and SLE2 applied to the first and second synchronizers SN1 and SN2 may be operated by actuators which may be controlled by a transmission control unit.

The plurality of gear sets may be mounted in an order of the first, second, and third gear sets GT1, GT2, and GT3 from an opposite side of the engine output shaft EOS.

FIG. 2 is a shifting operation chart for a power transmission apparatus configured for a hybrid vehicle according to various exemplary embodiments of the present invention, and the power transmission apparatus according to various exemplary embodiments performs shifting operation as follows.

[The First Forward Speed]

In the first forward speed FD1 in an engine mode, as shown in FIG. 2, the first intermediate shaft CS1 and the first shifting gear SG1 are synchronously interconnect by the operation of the sleeve SLE1 of the first synchronizer SN1, and simultaneously, the engine clutch ECL and the second and fourth clutches CL2 and CL4 are operated.

As a result, by the operation of the engine clutch ECL, the second clutch CL2, and the first synchronizer SN1, the torque of the engine ENG passes through the engine output shaft EOS, the first input shaft IS1, the first gear set GT1, the first intermediate shaft CS1, the third gear set GT3, the second intermediate shaft CS2, and the second gear set GT2.

As such, the torque received at the second gear set GT2 is transmitted to the differential DIFF through the output shaft OS by the operation of the fourth clutch CL4, realizing the first forward speed.

The first forward speed FD1 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the first forward speed FD1 in an electric vehicle mode (EV mode) by the driving torque of the motor/generator MG In the instant case, the reverse speed may be realized by operating the motor/generator MG in a reverse direction thereof.

The shifting operation for the first forward speed FD1 in the electric vehicle mode (EV mode) may be the same as in the first forward speed FD1 in the engine mode, which is therefore not described in further detail.

[The Second Forward Speed]

In the second forward speed FD2 in an engine mode, as shown in FIG. 2, the second input shaft IS2 and the second shifting gear SG2 are synchronously interconnect by the operation of the sleeve SLE2 of the second synchronizer SN2, and simultaneously, the engine clutch ECL, first and fourth clutches CL1 and CL4 are operated.

As a result, by the operation of the engine clutch ECL, the first clutch CL1, and the second synchronizer SN2, the torque of the engine ENG passes through the engine output shaft EOS, the second input shaft IS2, and the second gear set GT2.

As such, the torque received at the second gear set GT2 is transmitted to the differential DIFF through the output shaft OS by the operation of the fourth clutch CL4, realizing the second forward speed.

The second forward speed FD2 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the second forward speed FD2 in an electric vehicle mode (EV mode) by the driving torque of the motor/generator MG.

The shifting operation for the second forward speed FD2 in the electric vehicle mode (EV mode) may be the same as in the second forward speed FD2 in the engine mode, which is therefore not described in further detail.

[The Third Forward Speed]

In the third forward speed FD3 in an engine mode, as shown in FIG. 2, the engine clutch ECL and the third and fourth clutches CL3 and CL4 are simultaneously operated As a result, by the operation of the engine clutch ECL and the third clutch CL3, the torque of the engine ENG passes through the engine output shaft EOS, the first input shaft IS1, and the first gear set GT1, and is transmitted to the planet carrier PC of the planetary gear set PG.

Furthermore, while the planetary gear set PG receives an input torque through the planet carrier PC, the second gear set GT2 and the output shaft OS are interconnected by the operation of the fourth clutch CL4. Therefore, the planetary gear set PG forms a closed torque loop between the sun gear S and the ring gear R, and outputs the torque of the planet carrier PC to the differential DIFF through the output shaft OS, realizing the third forward speed FD3.

The third forward speed FD3 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The shifting operation for the third forward speed FD3 in the electric vehicle mode (EV mode) may be the same as in the third forward speed FD3 in the engine mode, which is therefore not described in further detail.

[The Fourth Forward Speed]

In the fourth forward speed FD4 in an engine mode, as shown in FIG. 2, the second input shaft IS2 and the second shifting gear SG2 are synchronously interconnect by the operation of the sleeve SLE2 of the second synchronizer SN2, and simultaneously, the engine clutch ECL, first and third clutches CL1 and CL3 are operated.

As a result, by the operation of the engine clutch ECL, the first clutch CL1, and the second synchronizer SN2, the torque of the engine ENG partially passes through the engine output shaft EOS, the second input shaft IS2, and the second gear set GT2, and is transmitted to the ring gear R of the planetary gear set PG.

Furthermore, by the operation of the engine clutch ECL and the third clutch CL3, the torque of the engine ENG partially passes though the engine output shaft EOS, the first input shaft IS1, and the first gear set GT1, and is transmitted to the planet carrier PC of the planetary gear set PG.

As such, the planetary gear set PG forms a shifted torque by a rotation speed difference between the ring gear R and the planet carrier PC, and outputs the shifted toque to the differential DIFF through the output shaft OS fixedly connected to the sun gear S, realizing the fourth forward speed FD4 in the engine mode.

The fourth forward speed FD4 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the fourth forward speed FD4 in an electric vehicle mode (EV mode) by the driving torque of the motor/generator MG.

The shifting operation for the fourth forward speed FD4 in the electric vehicle mode (EV mode) may be the same as in the fourth forward speed FD4 in the engine mode, which is therefore not described in further detail.

[The Fifth Forward Speed]

In the fifth forward speed FD5 in an engine mode, as shown in FIG. 2, the first intermediate shaft CS1 and the first shifting gear SG1 are synchronously interconnect by the operation of the sleeve SLE1 of the first synchronizer SN1, and simultaneously, the engine clutch ECL, second and third clutches CL2 and CL3 are operated.

As a result, by the operation of the engine clutch ECL, the second clutch CL2, and the first synchronizer SN1, the torque of the engine ENG partially passes through the engine output shaft EOS, the first input shaft IS1, the first gear set GT1, the first intermediate shaft CS1, the third gear set GT3, the second intermediate shaft CS2, and the second gear set GT2, and is transmitted to the ring gear R of the planetary gear set PG.

Furthermore, by the operation of the engine clutch ECL and the third clutch CL3, the torque of the engine ENG partially passes though the engine output shaft EOS, the first input shaft IS1, and the first gear set GT1, and is transmitted to the planet carrier PC of the planetary gear set PG.

As such, the planetary gear set PG forms a shifted torque by a rotation speed difference between the ring gear R and the planet carrier PC, and outputs the shifted toque to the differential DIFF through the output shaft OS fixedly connected to the sun gear S, realizing the fifth forward speed FD5 in the engine mode.

The fifth forward speed FD5 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the fifth forward speed FD5 in an electric vehicle mode (EV mode) by the driving torque of the motor/generator MG.

The shifting operation for the fifth forward speed FD5 in the electric vehicle mode (EV mode) may be the same as in the fifth forward speed FD5 in the engine mode, which is therefore not described in further detail.

Figure 3:
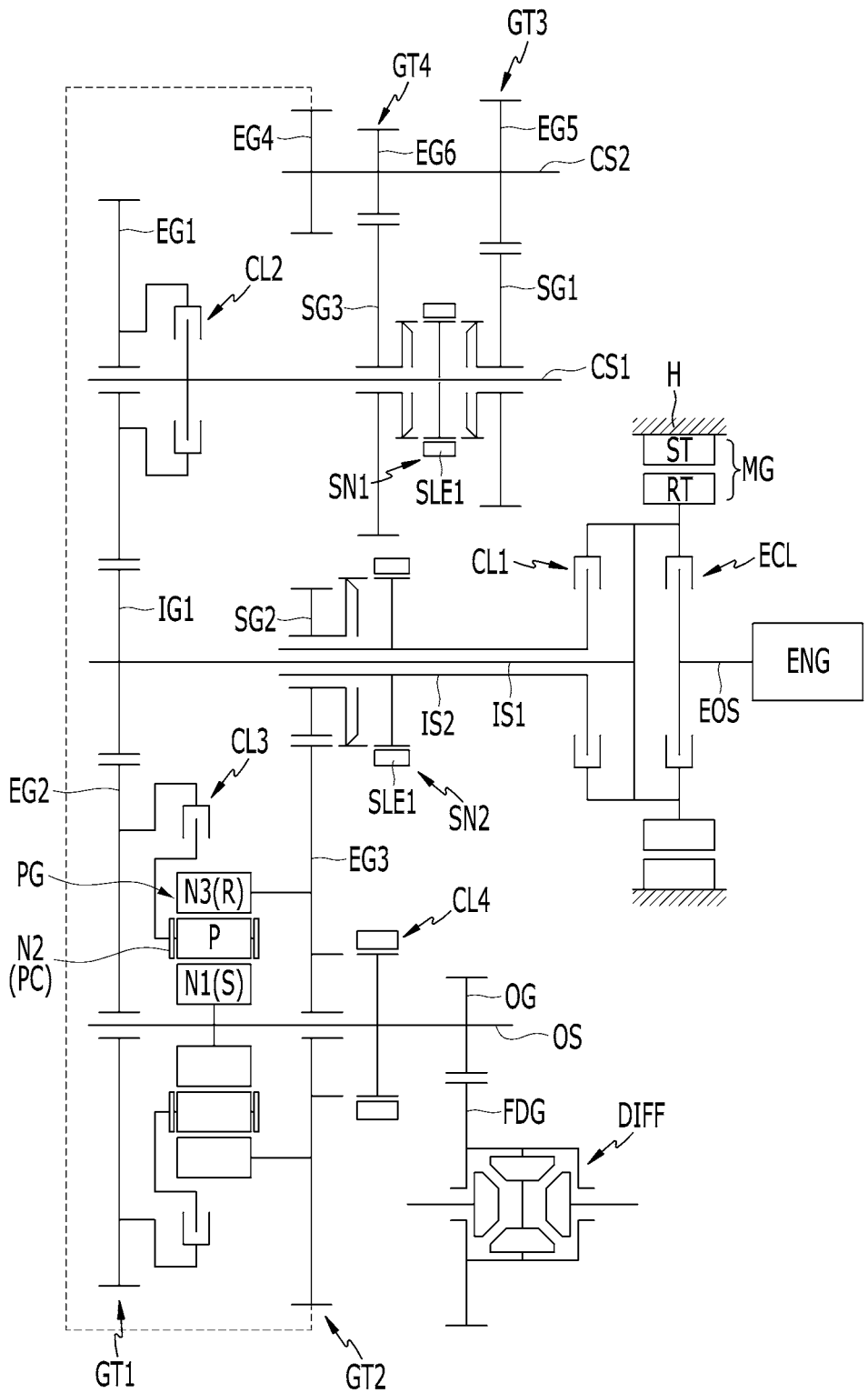
FIG. 3 is a schematic view of power transmission apparatus configured for a hybrid vehicle according to various exemplary embodiments of the present invention.

FIG. 3 is a schematic view of power transmission apparatus configured for a hybrid vehicle according to various exemplary embodiments of the present invention.

Referring to FIG. 3, a power transmission apparatus according to various exemplary embodiments differ from the various exemplary embodiments of FIG. 1 in that a fourth gear set GT4 is further included over the first intermediate shaft CS1 and the second intermediate shaft CS2, to realize various arrangement of the third forward speed.

The fourth gear set GT4 includes a third shifting gear SG3 and a sixth external gear EG6. The third shifting gear SG3 is rotatably mounted on the first intermediate shaft CS1 and selectively connectable to the first intermediate shaft CS1. The sixth external gear EG6 is fixedly connected to the second intermediate shaft CS2 and externally gear-meshed with the third shifting gear SG3.

As well as first shifting gear SG1, the third shifting gear EG3 is selectively connectable to first intermediate shaft CS1 by the first synchronizer SN1.

Such various exemplary embodiments in FIG. 3 of the present invention differs from the various exemplary embodiments of FIG. 1 substantially in that the fourth gear set GT4 is further included.

FIG. 4 is a shifting operation chart for a power transmission apparatus configured for a hybrid vehicle according to various exemplary embodiments of the present invention, and the power transmission apparatus performs shifting operation as follows.

The fourth gear set GT4 employed in the various exemplary embodiments relates to realizing a different form of the third forward speed FD3, and the different form of the third forward speed is described in detail below with reference to FIG. 4.

[The Third Forward Speed]

In a first example of the third forward speed FD3 in the engine mode, the engine clutch ECL and the third and fourth clutches CL3 and CL4 are simultaneously operated, the same as in the various exemplary embodiments. In a second example, the first intermediate shaft CS1 and the third shifting gear SG3 are synchronously interconnect by the sleeve SLE1 of the first synchronizer SN1, and the engine clutch ECL and the second and fourth clutches CL2 and CL4 are simultaneously operated. In a third example, the first intermediate shaft CS1 and the third shifting gear SG3 is synchronously interconnected by the sleeve SLE1 of the first synchronizer SN1, and the engine clutch ECL and the second and third clutches CL2 and CL3 are simultaneously operated.

In the first example, as in the various exemplary embodiments of the present invention, by the operation of the engine clutch ECL and the third clutch CL3, the torque of the engine ENG passes through the engine output shaft EOS, the first input shaft IS1, and the first gear set GT1, and is transmitted to the planet carrier PC of the planetary gear set PG.

Furthermore, while the planetary gear set PG receives an input torque through the planet carrier PC, the second gear set GT2 and the output shaft OS are interconnected by the operation of the fourth clutch CL4. Therefore, the planetary gear set PG forms a closed torque loop between the sun gear S and the ring gear R, and outputs the torque of the planet carrier PC to the differential DIFF through the output shaft OS, realizing the third forward speed FD3.

The third forward speed FD3 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The shifting operation for the third forward speed FD3 in the electric vehicle mode (EV mode) may be the same as in the third forward speed FD3 in the engine mode, which is therefore not described in further detail.

In the second example, by the operation of the engine clutch ECL, the second clutch CL2, and the first synchronizer SN1, the torque of the engine ENG passes through the engine output shaft EOS, the first input shaft IS1, the first gear set GT1, the first intermediate shaft CS1, the fourth gear set GT4, the torque0, and the torque1, and is transmitted to the torque3 of the torque2.

Furthermore, while the planetary gear set PG receives an input torque through the ring gear R, the second gear set GT2 and the output shaft OS are interconnected by the operation of the fourth clutch CL4. Therefore, the planetary gear set PG forms a closed torque loop between the sun gear S and the ring gear R, and outputs the torque of the planet carrier PC to the differential DIFF through the output shaft OS, realizing the third forward speed FD3 in the second example.

The third forward speed FD3 in the second example is described in connection with a case where a vehicle is driven by the torque of the engine ENG however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The shifting operation for the third forward speed FD3 in the electric vehicle mode (EV mode) may be the same as in the third forward speed FD3 in the engine mode, which is therefore not described in further detail.

In the third example, by the operation of the engine clutch ECL, the second clutch CL2, and the first synchronizer SN1, the torque of the engine ENG partially passes through the engine output shaft EOS, the first input shaft IS1, the first gear set GT1, the first intermediate shaft CS1, the fourth gear set GT4, the second intermediate shaft CS2, and the second gear set GT2, and is transmitted to the ring gear R of the planetary gear set PG.

Furthermore, by the operation of the engine clutch ECL and the third clutch CL3, the torque of the engine ENG partially passes though the engine output shaft EOS, the first input shaft IS1, and the first gear set GT1, and is transmitted to the planet carrier PC of the planetary gear set PG.

As such, the planetary gear set PG forms a shifted torque by a rotation speed difference between the ring gear R and the planet carrier PC, and outputs the shifted torque to the differential DIFF through the output shaft OS fixedly connected to the sun gear S, realizing the third forward speed FD3 in the third example.

The third forward speed FD3 in the third example is described in connection with a case where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the third forward speed FD3 in an electric vehicle mode (EV mode) by the driving torque of the motor/generator MG.

The shifting operation for the third forward speed FD3 in the electric vehicle mode (EV mode) may be the same as in the third forward speed FD3 in the engine mode, which is therefore not described in further detail.

According to a power transmission apparatus according to various exemplary embodiments of the present invention, three forward shifting stages may be realized between the second forward speed FD2 and the fourth forward speed FD4, where specific gear ratios of the three shifting stages may depend on specific gear ratios between the first to fourth gear sets GT1 to GT4. Thus, seven forward shift-speeds in total may be achieved by the exemplary embodiment of the present invention.

Figure 5:
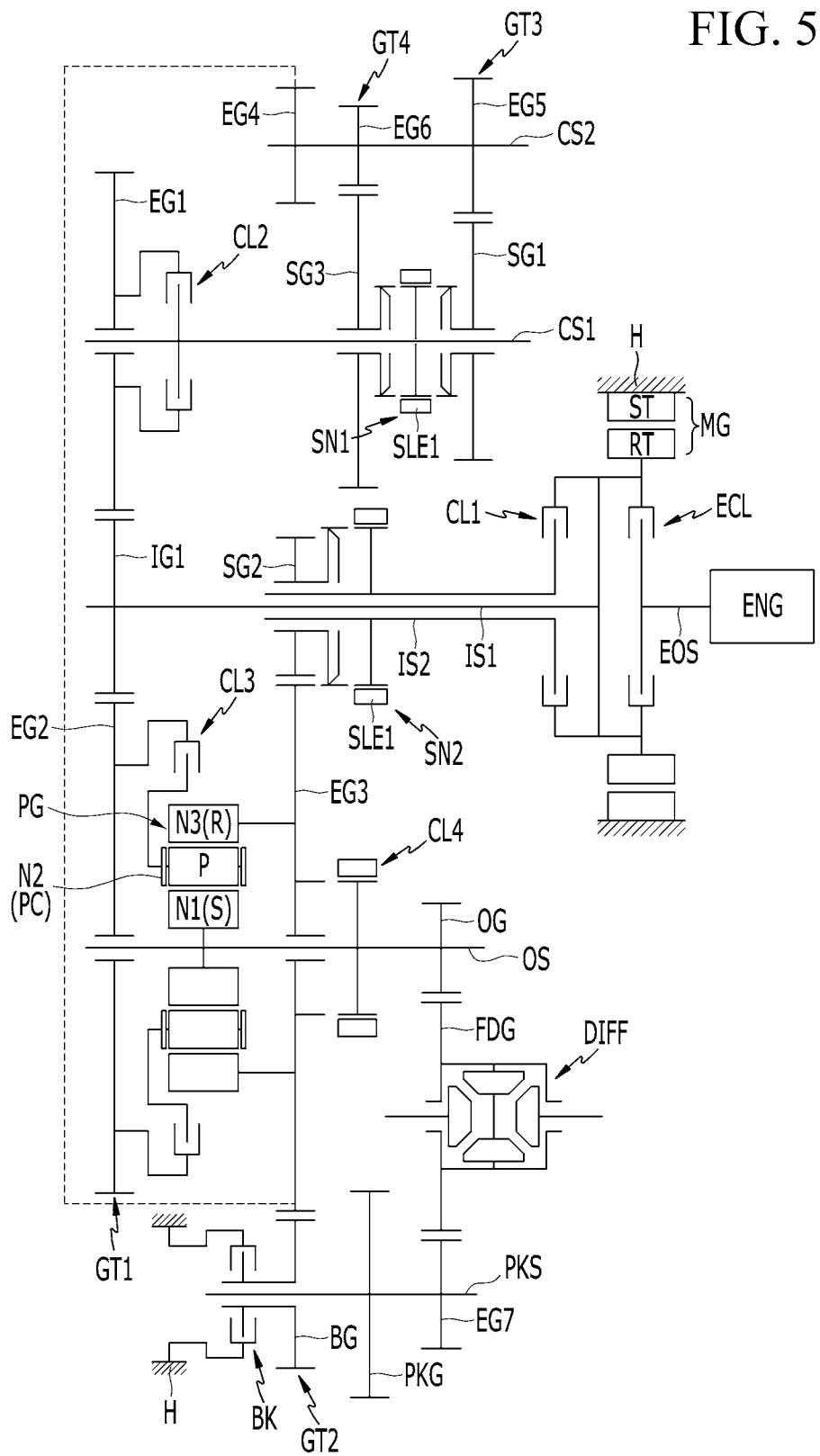
FIG. 5 is a schematic view of power transmission apparatus configured for a hybrid vehicle according to various exemplary embodiments of the present invention.

FIG. 5 is a schematic view of power transmission apparatus configured for a hybrid vehicle according to various exemplary embodiments of the present invention.

Referring to FIG. 5, in comparison with the various exemplary embodiments of FIG. 3, a power transmission apparatus according to various exemplary embodiments of FIG. 5 may further include a parking shaft PKS mounted in parallel with the output shaft OS. A seventh external gear EG7 externally gear-meshed with the final reduction gear FDG is fixedly connected to the parking shaft PKS, and a parking gear PKG is fixedly connected to the parking shaft PKS.

A braking gear BG is rotatably mounted on the parking shaft PKS and externally gear-meshed with the third external gear EG3 of the second gear set GT2. The braking gear BG is selectively connectable to the transmission housing H.

That is, the second gear set GT2 further includes the braking gear BG in addition to the second shifting gear SG2, the third external gear EG3, and the fourth external gear EG4 of the various exemplary embodiments.

The braking gear BG is selectively connectable to the transmission housing H through a brake BK. By the operation of the brake BK, the ring gear of the planetary gear set PG may be stopped through the braking gear BG and the third external gear EG3.

It is notable that the brake BK and the braking gear BG may stop the ring gear R of the planetary gear set PG, and thus the location of the brake BK and the braking gear BG may be altered if the ring gear R may be stopped.

Such various exemplary embodiments of FIG. 5, differ from the various exemplary embodiments of FIG. 3 substantially in that the parking shaft PKS and the brake BK are further included.

FIG. 6 is a shifting operation chart for a power transmission apparatus configured for a hybrid vehicle according to various exemplary embodiments of the present invention, and the power transmission apparatus may perform shifting operation as follows.

The parking shaft PKS and the brake BK that are further included in an exemplary embodiment of the present invention enable the ring gear R of the planetary gear set PG to act as a fixed element to further realize the sixth forward speed FD6. Thus, the sixth forward speed FD6 is below described in detail with reference to FIG. 6.

The first forward speed FD1 to the fifth forward speed FD5 may be realized the same as in the various exemplary embodiments.

[The Sixth Forward Speed]

In the sixth forward speed FD6 in an engine mode, as shown in FIG. 6, the engine clutch ECL and the third clutch CL3, brake BK are simultaneously operated As a result, by the operation of the engine clutch ECL and the third clutch CL3, the torque of the engine ENG passes through the engine output shaft EOS, the first input shaft IS1, and the first gear set GT1, and is transmitted to the planet carrier PC of the planetary gear set PG.

Furthermore, while the planetary gear set PG receives an input torque through the planet carrier PC, the ring gear R of the planetary gear set PG acts as a fixed element by the operation of the brake BK. Thus, the planetary gear set PG outputs an increased speed through the sun gear S to the differential DIFF, realizing the sixth forward speed FD6.

The sixth forward speed FD6 is described in connection with the engine mode where a vehicle is driven by the torque of the engine ENG, however, the parallel hybrid mode may also be available by merely additionally operating the motor/generator MG to supply an assistant torque.

Furthermore, when the motor/generator MG is operated while the engine clutch ECL is released and the engine ENG is stopped, a vehicle may be driven in the sixth forward speed FD6 in an electric vehicle mode (EV mode) by the driving torque of the motor/generator MG.

The shifting operation for the sixth forward speed FD6 in the electric vehicle mode (EV mode) may be the same as in the sixth forward speed FD6 in the engine mode, which is therefore not described in further detail.

As described above, according to an exemplary embodiment of the present invention, multiple shifting stages may be realized by applying a planetary gear set to a dual clutch type transmission, and by further employing a motor/generator, an electric vehicle mode and a parallel hybrid mode may be realized to the multiple shifting stages.

Furthermore, by realizing multiple shifting stages while simplifying internal structure, shifting efficiency may be improved and an overall weight may be decreased, improving an installability and fuel consumption characteristics.

Furthermore, an electric vehicle mode and a hybrid mode may be realized by operating a motor/generator, improving fuel consumption characteristics.

Furthermore, by additionally employing a gear set GT4, the third forward speed FD3 may be realized by three different schemes, facilitating a better choice depending on driving circumstances. By designing gear ratios of the first, second, and fourth gear sets GT1, GT2, and GT4, seven forward shifting stages in total may be achieved including three shifting stages between the second forward speed FD2 and the fourth forward speed FD4.

Furthermore, the sixth forward speed FD6 may be additionally realized by additionally employing a parking shaft PKS and a brake BK. BG For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a hybrid vehicle, the power transmission apparatus comprising:
   a motor/generator having a rotor selectively connectable to an engine output shaft fixedly connected to an engine;
   a first input shaft mounted coaxial with the engine output shaft and fixedly connected to the rotor;
   a second input shaft formed as a hollow shaft mounted coaxial with and external to the first input shaft, and selectively connectable to the first input shaft;
   first and second intermediate shafts mounted in parallel with the first input shaft;
   an output shaft mounted in parallel with the first and second input shafts and outputting a shifted torque;
   a planetary gear set mounted on the output shaft, having a first rotation element fixedly connected to the output shaft, selectively receiving torques from the first and second input shafts and the first and second intermediate shafts, and outputting the shifted torque based on the received torques to the output shaft; and
   a plurality of gear sets, each of which allows at least one torque flow between the first and second input shafts, the first and second intermediate shafts, and the output shaft.

2. The power transmission apparatus of claim 1, wherein the plurality of gear sets include:
   a first gear set including a first input gear, a first gear, and a second gear, the first input gear being fixedly connected to the first input shaft, the first gear being rotatably mounted on and selectively connectable to the first intermediate shaft and gear-engaged with the first input gear, the second gear being rotatably mounted on the output shaft, gear-engaged with the first input gear, and selectively connectable to a second rotation element of the planetary gear set;
   a second gear set including a second shifting gear, a third gear, and a fourth gear, the second shifting gear being rotatably mounted on the second input shaft and selectively connectable to the second input shaft, the third gear being rotatably mounted on the output shaft, gear-engaged with the second shifting gear, fixedly connected to a third rotation element of the planetary gear set, and selectively connectable to the output shaft, the fourth gear being fixedly connected to the second intermediate shaft and gear-engaged with the third gear; and
   a third gear set including a first shifting gear and a fifth gear, the first shifting gear being rotatably mounted on the first intermediate shaft and selectively connectable to the first intermediate shaft, the fifth gear being fixedly connected to the second intermediate shaft and gear-engaged with the first shifting gear.

3. The power transmission apparatus of claim 2,
   wherein the first, second and third rotation elements are a sun gear, a planet carrier and a ring gear, respectively,
   wherein the first shifting gear is selectively connectable to the first intermediate shaft by a first synchronizer; and
   wherein the second shifting gear is selectively connectable to the second input shaft by a second synchronizer.

4. The power transmission apparatus of claim 2, wherein the planetary gear set is formed as a single pinion planetary gear set.

5. The power transmission apparatus of claim 2, further including five clutches, each of which selectively allows the at least one torque flow between the first and second input shafts, the first and second intermediate shafts, and the output shaft.

6. The power transmission apparatus of claim 5, wherein the five clutches include:
   an engine clutch mounted between the engine output shaft and the first input shaft;
   a first clutch mounted between the first input shaft and the second input shaft;
   a second clutch mounted between the first gear and the first intermediate shaft;
   a third clutch mounted between the second gear and the second rotation element; and
   a fourth clutch mounted between the third gear and the output shaft.

7. The power transmission apparatus of claim 6, wherein the fourth clutch is formed as a teeth engagement clutch.

8. The power transmission apparatus of claim 1, wherein the plurality of gear sets include:
   a first gear set including a first input gear, a first gear, and a second gear, the first input gear being fixedly connected to the first input shaft, the first gear being rotatably mounted on and selectively connectable to the first intermediate shaft and gear-engaged with the first input gear, the second gear being rotatably mounted on the output shaft, gear-engaged with the first input gear, and selectively connectable to a second rotation element of the planetary gear set;
   a second gear set including a second shifting gear, a third gear, and a fourth gear, the second shifting gear being rotatably mounted on the second input shaft and selectively connectable to the second input shaft, the third gear being rotatably mounted on the output shaft, gear-engaged with the second shifting gear, fixedly connected to a third rotation element of the planetary gear set, and selectively connectable to the output shaft, the fourth gear being fixedly connected to the second intermediate shaft and gear-engaged with the third gear;
   a third gear set including a first shifting gear and a fifth gear, the first shifting gear being rotatably mounted on the first intermediate shaft and selectively connectable to the first intermediate shaft, the fifth gear being fixedly connected to the second intermediate shaft and gear-engaged with the first shifting gear; and
   a fourth gear set including a third shifting gear and a sixth gear, the third shifting gear being rotatably mounted on the first intermediate shaft and selectively connectable to the first intermediate shaft, the sixth gear being fixedly connected to the second intermediate shaft and gear-engaged with the third shifting gear.

9. The power transmission apparatus of claim 8,
   wherein the first, second and third rotation elements are a sun gear, a planet carrier and a ring gear, respectively, wherein the first shifting gear and the third shifting gear are selectively connectable by a first synchronizer; and wherein the second shifting gear is selectively connectable to the second input shaft by a second synchronizer.

10. The power transmission apparatus of claim 8, wherein the planetary gear set is formed as a single pinion planetary gear set.

11. The power transmission apparatus of claim 8, further including five clutches, each of which allows the at least one torque flow between the first and second input shafts, the first and second intermediate shafts, and the output shaft.

12. The power transmission apparatus of claim 11, wherein the five clutches comprise:
an engine clutch mounted between the engine output shaft and the first input shaft;
a first clutch mounted between the first input shaft and the second input shaft;
a second clutch mounted between the first gear and the first intermediate shaft;
a third clutch mounted between the second gear and the second rotation element; and
a fourth clutch mounted between the third gear and the output shaft.

13. The power transmission apparatus of claim 12, wherein the fourth clutch is formed as a teeth engagement clutch.

14. The power transmission apparatus of claim 1, further including a parking shaft mounted in parallel with the output shaft,
wherein a seventh gear gear-engaged with a final reduction gear is fixedly connected to the parking shaft, and
wherein a parking gear is fixedly connected to the parking shaft.

15. The power transmission apparatus of claim 14, wherein the plurality of gear sets include:
a first gear set including a first input gear, a first gear, and a second gear, the first input gear being fixedly connected to the first input shaft, the first gear being rotatably mounted on and selectively connectable to the first intermediate shaft and gear-engaged with the first input gear, the second gear being rotatably mounted on the output shaft, gear-engaged with the first input gear, and selectively connectable to a second rotation element of the planetary gear set;
a second gear set including a second shifting gear, a third gear, a fourth gear, and the braking gear, the second shifting gear being rotatably mounted on the second input shaft and selectively connectable to the second input shaft, the third gear being rotatably mounted on the output shaft, gear-engaged with the second shifting gear, fixedly connected to a third rotation element of the planetary gear set, and selectively connectable to the output shaft, the fourth gear being fixedly connected to the second intermediate shaft and gear-engaged with the third gear, the braking gear rotatably being mounted on the parking shaft, gear-engaged with the third gear, and selectively connectable to a transmission housing;
a third gear set including a first shifting gear and a fifth gear, the first shifting gear being rotatably mounted on the first intermediate shaft and selectively connectable to the first intermediate shaft, the fifth gear being fixedly connected to the second intermediate shaft and gear-engaged with the first shifting gear; and
a fourth gear set including a third shifting gear and a sixth gear, the third shifting gear being rotatably mounted on the first intermediate shaft and selectively connectable to the first intermediate shaft, the sixth gear being fixedly connected to the second intermediate shaft and gear-engaged with the third shifting gear.

16. The power transmission apparatus of claim 15,
wherein the first, second and third rotation elements are a sun gear, a planet carrier and a ring gear, respectively,
wherein the first shifting gear and the third shifting gear are selectively connectable by a first synchronizer; and
wherein the second shifting gear is selectively connectable to the second input shaft by a second synchronizer.

17. The power transmission apparatus of claim 15, wherein the planetary gear set is formed as a single pinion planetary gear set.

18. The power transmission apparatus of claim 15, further including:
five clutches, each of which selectively allows the at least one torque flow between the first and second input shafts, the first and second intermediate shafts, and the output shaft; and
a brake selectively connecting the third rotation element to the transmission housing.

19. The power transmission apparatus of claim 18, wherein the five clutches include:
an engine clutch mounted between the engine output shaft and the first input shaft;
a first clutch mounted between the first input shaft and the second input shaft;
a second clutch mounted between the first gear and the first intermediate shaft;
a third clutch mounted between the second gear and the second rotation element; and
a fourth clutch mounted between the third gear and the output shaft, and
wherein the brake is mounted between the braking gear and the transmission housing.

20. The power transmission apparatus of claim 19, wherein the fourth clutch is formed as a teeth engagement clutch.

* * * * *